Figure 4:
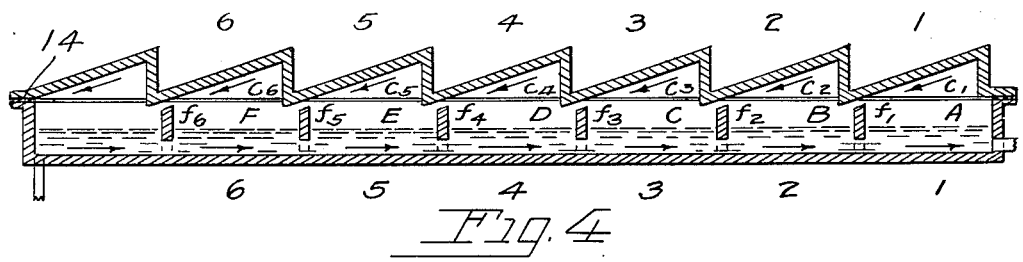

Aug. 17, 1948.   A. K. BREWER ET AL   2,446,997
MOLECULAR DISTILLATION PROCESS AND APPARATUS
FOR THE SEPARATION OF ISOTOPES, ETC.
Filed March 11, 1943   2 Sheets-Sheet 1
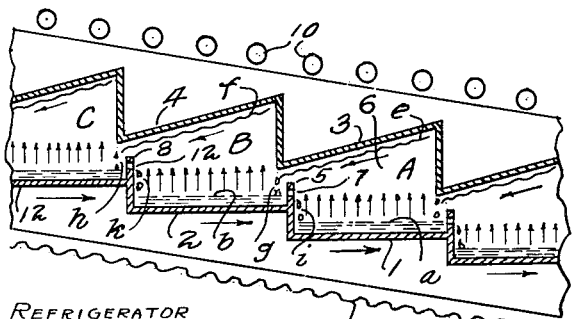
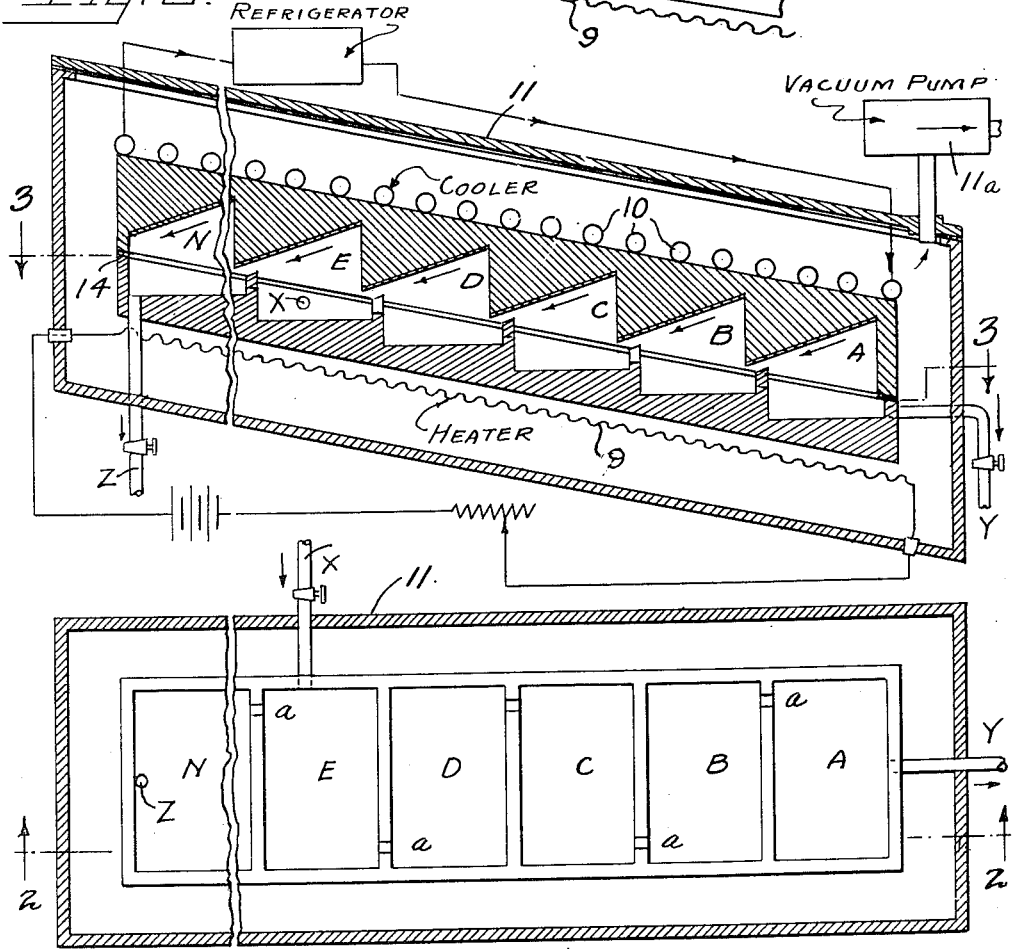
INVENTORS
AUBREY KEITH BREWER AND
SAMUEL L. MADORSKY
By J. J. Mothershead
ATTORNEY Aug. 17, 1948.    A. K. BREWER ET AL    2,446,997
MOLECULAR DISTILLATION PROCESS AND APPARATUS
FOR THE SEPARATION OF ISOTOPES, ETC.
Filed March 11, 1943                    2 Sheets-Sheet 2

AUBREY KEITH BREWER AND
SAMUEL L. MADORSKY
INVENTORS

BY *J. F. Motherhead*
ATTORNEY

10. # UNITED STATES PATENT OFFICE 2,446,997

MOLECULAR DISTILLATION PROCESS AND APPARATUS FOR THE SEPARATION OF ISOTOPES, ETC.

Aubrey Keith Brewer, Richland Center, Wis., and Samuel Leo Madorsky, Chicago, Ill., assignors, by mesne assignments, to the United States of America as represented by the United States Atomic Energy Commission Application March 11, 1943, Serial No. 478,844

13 Claims. (Cl. 202—52)

(Granted under the act of March 3, 1883, as amended April 30, 1928; 370 O. G. 757)

The invention herein described may be made and used by or for the Government of the United States without payment to either of us of any royalty therefor.

The present invention relates to the separation of liquid mixtures, especially liquids containing isotopes, by the method of free evaporation.

When a liquid containing isotopes, for example, is enclosed in a chamber evacuated to a very low pressure, of the order of a millimeter of mercury, and the temperature of the liquid is so adjusted that the vapor pressure of this liquid is of the order of a millimeter or less of mercury, the individual atoms or molecules leaving the liquid will travel appreciable distances before returning to the liquid surface. If a condensing surface is placed at a distance from the evaporating surface less than or equal to only a few times the mean free path of the atoms or molecules in the vapor and maintained at a lower temperature than the evaporating surface, the relative abundance of the isotopes in the condensate will be substantially the same as that in the vapor at the moment the vapor leaves the liquid surface. This is due to the fact that the individual particles of the vapor, in traveling the short distance between the evaporating and condensing surfaces are not deviated much from their path by collisions with each other, the movement of the vapor being substantially unidirectional. If the system is kept evacuated to a point where the non-condensable particles, such, for example, as air molecule, are at a pressure of about $10^{-5}$ or $10^{-6}$ of a millimeter of mercury, the collisions of these particles, which are in a state of random motion, with the condensable particles of the vapor will not be numerous enough to affect appreciably the unidirectional motion of the condensable particles. As a result only a small number of the condensable particles leaving the liquid surface are returned to this liquid through collisions in the vapor phase, and the composition of the vapor at the moment of condensation is substantially the same as at the moment of evaporation.

To illustrate the basic separating action, let us take a simple case of a liquid containing two isotopes, the light and heavy molecules which carry them having masses $m_1$ and $m_2$. If the vapor pressures of the separate isotopes are the same, as is nearly the case, since they have nearly identical boiling points, kinetic theory requires that the abundance ratio of light to heavy molecules in the vapor leaving the liquid shall be $$\sqrt{\frac{m_2}{m_1}}$$

times the abundance ratio in the liquid.

Thus we see that in the vapor and, consequently, in the condensate, the ratio of the heavy to the light isotope is smaller than in the liquid phase being evaporated. A partial separation of the two isotopes is thus effected; the condensate will contain a larger proportion of the light isotope and the residue, i. e., the evaporating liquid, a larger proportion of the heavy isotope, than the original liquid. However, in most cases this separation is very small and, in order to make a further separation, the light and heavy fractions have to be treated separately by a manifold repetition of the same process, which in the past required the expenditure of a great deal of labor and material.

Separation of isotopes by free evaporation has been attempted previously in the case of mercury by Brönsted and Hevesy (Phil. Mag., 1922, 43, 3) who condensed the vapor in the form of a solid using a glass apparatus, by Mulliken and Harkins (J. Am. Chem. Soc., 44, 37-65, 1922), who condensed the vapor as a liquid on a slanting roof, using also a glass apparatus, and by Harkins and Madorsky (J. Am. Chem. Soc., 45, 591-601, 1923), who employed substantially the method of Mulliken and Harkins, but employed a large steel apparatus.

In all these attempts the apparatus consisted of a single-operation cell, containing one evaporating and one condensing surface and involving a laborious process of collecting the fractions, recombining, and re-evaporating them, before a perceptible separation of isotopes was accomplished.

The enormous amount of labor and material involved in the separation of isotopes by the use of a single cell apparatus of the type employed by Brönsted and Hevesy, Milliken and Harkins, and Harkins and Madorsky, may be appreciated by considering the simple case of a mixture of two isotopes of potassium, $K^{39}$ and $K^{41}$. The relative abundance of these isotopes is 94.6 percent for the light and 5.4 percent for the heavy isotope respectively, so that in this case the abundance ratio in the natural liquid is $$\frac{5.4}{94.6}$$

Let us assume that we are going to increase R from $$\frac{5.4}{94.6} \text{ to } \frac{50}{50}$$

i. e. from 5.4 percent to 50 percent of the heavy isotope $K^{41}$ in the mixture.

In this case the separation factor S is equal to $$\frac{50}{50} \div \frac{5.4}{94.6} = 17.52$$

The number of separate beneficiating stages of evaporation, or "cuts" required to obtain a 50% concentration of $K^{41}$ is obtained from the equation $$17.52 = \left(\sqrt{\frac{m_2}{m_1}}\right)^x$$

where $m_2$ and $m_1$ are equal to 41 and 39 respectively, and X is the number of cuts. Solving this equation for X, we find $X=115$. One can readily see that the amount of work and material involved in cutting the liquid potassium by a series of 115 separate beneficiating evaporations, would be staggering. This cannot be done without recombining the fractions, as for such purpose the amount of original material required to obtain, for example, 1 gram of a 50% heavy potassium (assuming that in each cut one-half of the liquid potassium is distilled off) would be:

$$1 \times 2^{115} = 4.2 \times 10^{34} \text{ grams}$$

which is equivalent to $4.2 \times 10^{28}$ metric tons (cf. weight of the earth, $5.98 \times 10^{21}$ metric tons). Hence, the fractions from each composition must be recombined again and again, and in the course of fractionation the amount of labor involved becomes enormous.

One object of the present invention is to avoid the enormous amount of labor and material involved in effecting separations of this character.

By the use of 115 cells in accordance with our invention the result described above can be obtained in one operation. The amount of original material required to obtain one gram of 50:50 mixture of $K^{39}$ and $K^{41}$ in accordance with our invention is equal to the ratio $50/50 \div 5.4/94.6 = 17.5$ grams, a number which is very small compared with the impossible amount of $4.2 \times 10^{34}$ grams.

Figure 5:
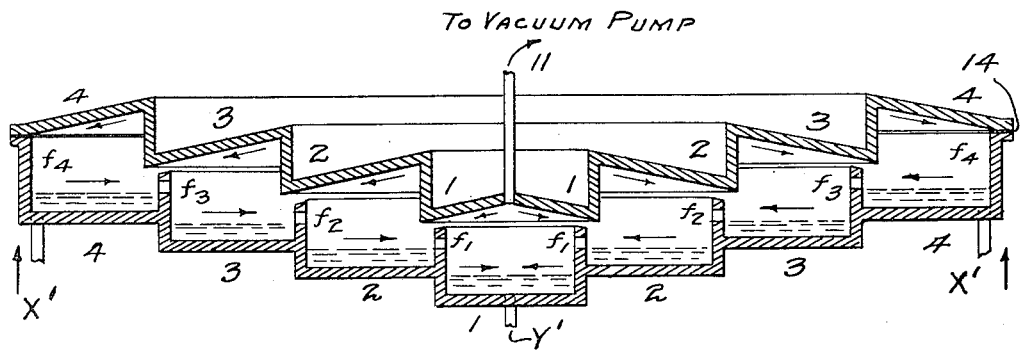

Various modifications of our invention are shown schematically in Figs. 1, 2, 3, 4 and 5. Figure 1 shows an apparatus suitable for carrying out the process of the invention wherein a series of cells are located slightly declined to the horizontal with the heating means positioned below the cells and cooling means above the condenser roofs; Figure 2 shows the arrangement of cells of Figure 1 inclosed in a suitable casing with cooling and heating means positioned within the casing; Figure 3 is a sectional view of the apparatus of Figure 2, taken on the line 3—3; Figure 4 is a modified form of apparatus wherein all cells are located in one plane either horizontal or slightly inclined to the horizontal; Figure 5 is another modified form of the apparatus wherein the cells are spaced concentrically. The method of operation can be seen by referring to Fig. 1 in which cells A and B and part of cell C of a large system of cells are illustrated in detail.

A single cell B consists of an evaporating trough 2 containing liquid $b$ whose constituents are to be separated. The partition between trough 2 of cell B and trough 1 of cell A is shown as wall 5. This wall separates the liquid in the two cells and is provided with an opening 7 to permit the liquid to overflow by gravity from cell trough 2 to trough 1.

A condensing roof 4 is placed immediately above trough 2, cell B, at such a slope that the condensed vapor will run down by gravity along its lower surface and will drop into cell C. Similarly, the vapor rising from the liquid $a$ in cell A condenses on roof 3 and the condensate flows by gravity into cell B. The condensing roofs must be made of such material that it is wetted by the condensate.

Heating means for the liquid in the cells is provided, herein shown as electrical heating element 9 placed below the cells and the temperature of the evaporating liquid $a$, $b$, is adjusted to give the required speed of vaporization.

Cooling means for the condenser roofs is provided, herein shown as refrigerating element 10 placed directly above roofs 3 and 4, and the temperature of the roofs is so adjusted that the vapor rising from liquid $a$ and $b$ will be condensed.

Means is also provided to minimize heat transfer from the evaporating section to the condensing section of the apparatus (by other than the distilling liquid) herein shown as an insulating gap 14 (Figs. 2 to 5) which may be filled with a gasket, spacer, or wall, or glass, asbestos, or other good heat insulating material, if it is desired to support the condenser section on the evaporating section, as shown in Figs. 2 through 5.

Any suitable arrangement may be employed to effect good heat transfer to the liquid in troughs 1, 2 and from the condensate condensing on the condenser surfaces 3, 4. Thus the coils may be embedded in the elements to be heated and cooled, insulation may be used in the normal manner, and coils 10 may be immersed in a liquid such as brine or mercury, confined, for example, in a tank having roofs 3, 4 as its bottom.

Any suitable means may also be employed to produce a very low pressure of residual gas in the cells, A, B, C; for example, the entire system may be enclosed in a suitable casing (indicated diagrammatically at 11 in Figs. 2 and 3) which can be evacuated, as by pump 11a, to reduce the non-condensable gas content of the cells to such extent as to provide molecular or unidirectional distillation conditions.

In operating this system as a molecular still heat is applied through heating element 9 to cells 1, 2 . . . so that the vapor pressure of the constituents of $a$, $b$ . . . will reach some pressure, preferably below 1 mm. of Hg. Assuming that all the constituents of the liquid have identical vapor pressures, the rate of escape of the various molecular species from the liquid surfaces of $a$, $b$ . . . will be proportional to their relative molecular velocities. If $a$, $b$ . . . contain molecules of masses $m_1$ and $m_2$ in concentrations $n_1$ and $n_2$, the number of molecules escaping from the surface can be shown by kinetic theory to have the ratio $$\frac{n_1/\sqrt{m_1}}{n_2/\sqrt{m_2}}$$

Thus, when $m_1$ is lighter than $m_2$ the vapor will contain an excess of the light constituent over that in the liquid by an amount equal to $\sqrt{m_2/m_1}$ Since substantially all non-condensable gases have been removed from the system, the molecules escaping, for example, from $b$ will move in a procession across the gap or space 6 towards roof 4 without undergoing collisions with other molecules of random direction, and so without being deflected back toward $b$, so long as conditions are maintained which avoid the presence of any undue number of molecules of random motion in this gap. The present arrangement facilitates the maintenance of such conditions in several respects. Thus, for example, it facilitates removal of any freed occluded non-condensables; provides for maintaining the condensate on the condensing roofs 3, 4 at such temperature that its vapor pressure is negligible compared with that of the treated liquid $a$, $b$; enables reduction of the area of warm walls above the level of the liquid $a$, $b$; and arranges such walls as are necessary to have but little effect on the main body of processionally moving molecules. The particular method and arrangement of parts, indeed, enables maintenance of substantially unidirectional distillation at temperatures of evaporation corresponding to vapor pressures at which the normal mean free path in a non-processional system, would be several hundred times smaller than the distance between the evaporating and condensing surfaces, by causing most of the energy of the escaping molecules to appear as velocity head having its principal component in the processional direction, and permitting so little of the energy of the escaping molecules to appear as static pressure in the gap (pressure of molecules of random direction) that the mean free path of the molecules under such static pressure is not significantly smaller than the distance between the evaporating and condensing surfaces.

Thus in the arrangement shown the warmed cell-separating end walls 5, 8 of Fig. 1 and the lateral walls of the cells (Fig. 3) are kept low relative to the area of the evaporating liquid $a$, $b$ so that but a very small portion of the evaporating molecules can impinge against these walls. Molecules which may inpinge on the vertical walls between the inclined condenser roofs 3, 4 are condensed and drip back into the pools $a$, $b$ without coursing across any warm walls and hence without disseminating any deleterious quantity of vapor molecules of random direction.

In consequence of the operation of such a molecular still the condensate on the cold surface 4 will be lighter than the liquid by an amount quite closely approaching the theoretical limit of improvement, $\sqrt{m_2/m_1}$.

The illustrated arrangement of the cells and the inclined roofs is particularly advantageous, as it provides automatic refluxing without use of pumps. The vapor from $b$ condensing on roof 4 into a film $f$ will adhere to the wettable surface and flow down in drops $h$ into trough 12 of cell C; similarly, from roof 3, in droplets $g$, into trough 2 of cell B, etc. In this way the vapor from liquid $a$, cell A, is condensed and transferred to liquid $b$, cell B, etc. The liquid thus added to $b$ causes the level in trough 2 to rise and to overflow through opening 7 into trough $a$ in drops $i$. Thus a counter-current movement is established in which the lighter components are transferred from cell A to cell B and the heavy components from cell B to cell A, etc. When equilibrium is established, liquid $b$ will be lighter than liquid $a$ by an amount $a$ equal to $\sqrt{m_2/m_1}$. In an entire system composed of a series of cells as described the over-all separation factor S is equal to $(a)^x$ where $x$ is the number of cells, less one, in the series.

In addition to operating as a molecular still in which our invention has unique advantages, the invention may be employed advantageously in the separation of constituents of a liquid having different vapor pressures and operating on the principle of high-vacuum equilibrium distillation. In this case the component having the higher vapor pressure will be transported in the direction A to B to C in Fig. 1, while the less volatile material will be transported in the direction C to B to A. It is also possible for the system to combine the effects of molecular distillation and equilibrium distillation, thus giving a single cell separation much greater than the ratio $\sqrt{m_2/m_1}$ for molecular distillation only.

A series of cells in the form of a complete system is illustrated in Figs. 2 and 3. The liquid to be separated is admitted near the center of the system through the inlet X. The light component is withdrawn through outlet Z at the upper end of the system and the heavy component through Y at the lower end of the system.

An alternative arrangement is to close off or omit inlet X as shown. In this alternative, if it is desired to concentrate the light fraction only, the lowest cell A is preferably connected for constant level supply from a large reservoir containing a quantity of the material to be separated, while the light fraction is withdrawn from the cell F through outlet Z; if it is desired to concentrate the heavy fraction only, the highest cell F may be connected for constant level supply from the reservoir containing the material, and the heavy fraction may be withdrawn from cell A through outlet Y. In either event, the rate of withdrawal will be kept at a value not seriously interfering with refluxing.

Another alternative arrangement is shown in Fig. 4. All the cells in this arrangement are located in one plane either horizontal or slightly inclined to the horizontal, so that the liquid in the cells flows from 6 to 5 to 4, etc. through openings $f_6$, $f_5$, $f_4$, etc. respectively, while the condensate flows from roof $C_1$ into cell B, from roof $C_2$ into cell C, etc. When the cells are in a horizontal plane the condensates moving from right to left will cause the liquid in the cells to flow from left to right because of the tendency of the liquid in all the cells to reach the same level. This arrangement has the advantage of enabling the condensing roof in each cell to be placed closer to the evaporating surface, and enabling greater reduction of the area of heated walls above the evaporating surface, than is possible by the arrangement of cells illustrated in Figs. 1, 2 and 3, and thus makes for still greater efficiency in operation.

When the liquid $f_1$, $f_2$, $f_3$, etc. is in the form of a thin film, the partitions between cells may, preferably, be replaced by low ribs or riffles, which will effectively eliminate even the small chance for back diffusion of the liquid from the heavier to the lighter fractions, which would exist in an unpartitioned film.

Still another modification of our apparatus is shown in Fig. 5. In this arrangement the cells are spaced concentrically. This modification is desirable when $a$ is large and only a few cells are required. It is particularly advantageous as it eliminates entirely any warmed lateral walls above the liquid level, and thus further reduces curtailment of efficiency by such walls.

It is evident from the above illustrations that the evaporator and condenser walls can themselves serve as the confines of the evacuated chamber as is shown in Fig. 5 where pipe 11 leads directly from the space between the evaporator and condenser to a vacuum pump. This, however, does not provide for dispersal of freed occluded noncondensables as well as an outer chamber, which is therefore preferred in all embodiments.

In addition, as shown in Fig. 5, when a straight-through reflux is contemplated, in which raw distilland is fed into one end of the series of distillation trays, as at inlet X', and the distillate, concentrated as to one constituent (the heavy isotope when Fig. 5 is employed for isotope separation), is withdrawn from the other end of the series, as at outlet Y', it is contemplated that the members of the series will be formed with decreasing areas in the direction of concentration, in the interest of producing equal transfers of the desired constituent at each stage to thus promote thermal efficiency. This is advantageously accomplished, as in Fig. 5, by employing a concentric annular arrangement of the several stages, as in this manner the decreasing areas may be formed while mintaining a relatively constant width of the several annular troughs.

We do not wish to limit ourselves to the above enumerated examples of method or apparatus given simply as illustrations of the invention. We have not shown the inlets and outlets in all the alternative designs, but, it is evident to those skilled in the art from our disclosure that these can be arranged as in Fig. 2. Where an extensive series of troughs is used inlets and outlets may be provided at regular intervals to provide an even distribution of the liquid entering and leaving the apparatus. It is also evident that an end cell may be put in direct communication with a large reservoir of previously beneficiated material to be further concentrated.

One advantage of our method and apparatus over those now in practice rests on the fact that they will function efficiently (1) in the separation of isotopes of an element in a given liquid, where the vapor pressures of the various molecular masses constituting or containing the isotopes are identical, (2) in the separation of molecular constituents of a liquid where these constituents have different vapor pressures, (3) in the separation of the molecular masses constituting an azeotropic or constant boiling mixture such as a separation of $HCl^{35}$ from $HCl^{37}$ from an azeotropic solution of HCl in $H_2O$ and (4) in any combination of the other three cases.

Another advantage of our invention results from the design of the condensing roofs. If the material for roof-construction is so chosen that the condensate liquid wets it properly, the roofs can be made to slope only a few degrees. Even in case where wetting of the roof by the liquid is poor, such, for example, as, mercury condensing on a glass roof we found that a slope as low at 25° could be employed. The use of a small slope of the roofs makes it possible to bring the condensing surface to within only a few millimeters from the evaporating surface, which in turn permits the use of much higher pressures in molecular distillation than would otherwise be permissible. Experiments have shown that such a system operated efficiently as a molecular still separating the isotopes of mercury when the average distance between the evaporating and condensing surfaces was about 15 mm. and the temperature of the liquid was about 75° C., the pressure of non-condensables, as shown by a McLeod gauge, being reduced to about 0.000001 mm. of Hg, and the condensing roof being maintained at about 0° C. at which the vapor pressure of mercury is about 0.000185 mm. In the case of separation of molecular masses by equilibrium distillation very high vapor pressures can, of course, be employed.

In particular, the gravity refluxing system of the present invention has the advantage that the rate of reflux from cell to cell is automatically controlled by the rates of evaporation in the cells, so that the proper equilibrium is automatically established and maintained and the system may be operated without constant attendance or complicated regulators.

It will be appreciated from the illustrative examples set forth above that various other modifications can be made in the procedure and apparatus without departing from our invention, and that we are not to be considered as limited to the illustrated details disclosed to exemplify our new and useful contributions to the art.

We claim as our invention:

1. Process for rectifying a liquid mixture by unidirectional distillation which comprises heating a first part of the liquid, condensing the vapor therefrom on a surface higher than the level of said first part, flowing the condensate by gravity from said surface to another part of the liquid and replacing the liquid evaporated from the first part by liquid comprising at least a portion of said condensate flowing by gravity from said second part whereby a difference in abundance of the components in the two parts is established.

2. Process of rectifying a liquid mixture by unidirectional distillation which comprises heating a plurality of serially adjacent parts of the liquid, condensing the vapor from said parts on individual surfaces higher than the respective levels of said parts, flowing the condensate by gravity from each surface to the next adjacent part of the liquid, and replacing the liquid evaporated from one part by liquid comprising at least a portion of said condensate flowing by gravity from said next adjacent part whereby a concentration gradient is established between adjacent parts of said serially adjacent parts.

3. A multiple stage molecular distillation system comprising means forming a plurality of heated distillation pools communicating by gravity flow from pool to pool, in a downward direction, and means, including surfaces overlying said respective pools, adapted to deliver by gravity condensed distillate from the respective pools to the adjacent upstream pools, respectively.

4. A system according to claim 3 in which the respective pools have decreasing areas respectively in the direction in which concentration of the desired constituent is effected by the system.

5. In the separation of isotopes and the like by free-evaporation of a liquid mixture containing the same, employing a method of the type which includes establishing an evaporation surface of the liquid and an overlying condensing surface for the vapor and controlling the temperatures thereof and the pressure within the intervening gap to cause a substantive portion of the condensate to derive from molecules passing from the evaporating to the condensing mixture with generally unidirectional motion and without collision with molecules of random motion in the gap; the improvement which consists in subdividing the evaporating and overlying condensing surfaces into serially adjacent parts, causing the liquid to flow by gravity in a downstream direction from part to part of said evaporation surface, and causing the condensate to flow by gravity in an upstream direction from each part of said condensing surface to the next upstream part of said evaporation surface; whereby gravity refluxing of the molecular distillation operation is accomplished.

6. In molecular distillation of the multi-stage type, the method which consists in flowing distilland by gravity from stage to stage in one direction, unidirectionally distilling and condensing distillate therefrom at the several stages, and flowing the condensate by gravity from stage to stage in the opposite direction, thereby effecting gravity-refluxing of the molecular distillation.

7. Concentrating apparatus of the class described, comprising a stepped series of trays defining distilland retaining pools, said trays arranged for overflow of distilland from tray to tray; a stepped series of condensing roofs overlying said respective trays, inclined downwardly in the direction counter to the direction of overflow, and discharging condensate from respective pools to upstream pools by gravity; means for heating said trays; means for cooling said roofs, and means for producing a high vacuum in the space between said trays and roofs; thereby providing for automatic gravity refluxing of the distillation.

8. Apparatus according to claim 7, said condensing roofs having condensing surfaces wetted by the material being condensed and thereby facilitating adhesion and flow of condensate thereon at relatively low angles of inclination to the horizontal.

9. Apparatus according to claim 8, in which the arrangement for overflow from tray to tray consists in apertures formed in the tray walls near the opposite lateral ends of alternate trays, whereby the distilland flows generally laterally from end to end of each tray.

10. Apparatus according to claim 8, in which the arrangement for overflow from tray to tray consists in apertures formed in the tray walls near the opposite lateral ends of alternate trays, whereby the distilland flows generally laterally from end to end of each tray, and in which the lower edge of the inclined condensing surface discharging to a given tray extends over the underlying tray wall in closely spaced relation thereto, thereby minimizing communication between the vapor space supplying vapor to said condensing surface and the vapor space of said given tray.

11. Apparatus according to claim 8, in which the members of said stepped series of trays and of the overlying condensing roofs have annular walls and are concentrically arranged relative to each other, thereby reducing the area of heated walls above the liquid surface.

12. Apparatus according to claim 8, in which the members of said stepped series of trays and of the overlying condensing roofs have annular walls and are concentrically arranged relative to each other, in which means is provided for feeding raw distilland to one end of the series and withdrawing concentrated distillate from the other end of the series, and in which the members of the series have decreasing areas from one end of the series to the other in the direction of concentration of the desired constituent.

13. In molecular distillation of the multi-stage type, the method which consists in moving a stream of distilland substance by gravity from stage to stage in one direction, unidirectionally vaporizing and condensing substance therefrom at the several stages, and returning the condensed substance to the stream by gravity from stage to stage in the opposite direction, thereby effecting gravity refluxing of the molecular distillation.

AUBREY KEITH BREWER.
SAMUEL LEO MADORSKY.

REFERENCES CITED

The following references are of record in the file of this patent:

UNITED STATES PATENTS

| Number | Name | Date |
| --- | --- | --- |
| 781,045 | Sewell | Jan. 31, 1905 |
| 2,117,802 | Hickman | May 17, 1938 |
| 2,128,223 | Frazer | Aug. 30, 1938 |
| 2,298,377 | Hickman | Oct. 13, 1942 |